(12) United States Patent
Fomperie et al.

(10) Patent No.: US 6,506,841 B2
(45) Date of Patent: Jan. 14, 2003

(54) COMPOSITION HAVING IMPROVED THERMOMECHANICAL PROPERTIES, AND A METHOD OF CROSS-LINKING IT

(75) Inventors: Lionel Fomperie, Auffargis (FR); Madeleine Prigent, Marcoussis (FR)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/848,327

(22) Filed: May 4, 2001

(65) Prior Publication Data

US 2002/0022697 A1 Feb. 21, 2002

(30) Foreign Application Priority Data

May 5, 2000 (FR) .............................. 00 05775

(51) Int. Cl.⁷ ..................... C08L 23/00; C08L 23/04; C08L 33/04; C08L 35/02; C08F 8/00
(52) U.S. Cl. ..................... 525/191; 525/192; 525/194; 525/195; 525/222; 525/240
(58) Field of Search ................. 525/191, 192, 525/194, 195, 222, 240

(56) References Cited

U.S. PATENT DOCUMENTS

| 3,427,187 A | 2/1969 | Wiggill |
| 5,389,728 A | 2/1995 | Prejean |
| 5,532,329 A | 7/1996 | Filges et al. |
| 5,773,145 A * | 6/1998 | Inoue et al. ................ 428/389 |
| 5,905,106 A | 5/1999 | Prigent et al. |

FOREIGN PATENT DOCUMENTS

| BE | 840655 | 10/1976 |
| EP | 0 656 390 A1 | 6/1995 |
| EP | 0 802 224 A1 | 10/1997 |
| GB | 2 099 829 A | 12/1982 |
| GB | 2 267 283 A | 12/1993 |
| WO | WO 88/05449 | 7/1988 |

* cited by examiner

Primary Examiner—Nathan M. Nutter
(74) Attorney, Agent, or Firm—Sughrue Mion, PLLC

(57) ABSTRACT

The present invention relates to a composition that is extrudable and cross-linkable in air. The composition that is extrudable and cross-linkable in air comprises a mixture of a copolymer with an ethylenically-unsaturated compound and an unsaturated ester, a hydrolizable silane compound having no ethylenic unsaturation containing functional groups, and a thermoplastic polymer having no functional groups, said functional groups of the ester being selectively reactive with the functional groups of the silane compound. Such a composition is used to fabricate a material for insulating or sheathing a power cable, in particular a medium-voltage cable or a cable for working at a voltage of less than 20 kV. The invention also provides method enabling said composition to be cross-linked and power cables including insulation and/or a sheath containing the composition obtained by the method.

22 Claims, No Drawings

COMPOSITION HAVING IMPROVED THERMOMECHANICAL PROPERTIES, AND A METHOD OF CROSS-LINKING IT

The present invention relates to an extrudable composition that can be cross-linked in air, and also to a method of cross-linking said composition.

BACKGROUND OF THE INVENTION

This composition is for use in the manufacture of sheathing material for medium and low-voltage power cables or for telecommunications cables. These cables carry direct current (DC) or alternating current (AC). Medium-voltage cables are generally constituted by a conductive core surrounded by an insulating structure that is coaxial thereabout. The structure comprises at least a semiconductive first layer placed in contact with the core of the cable, itself surrounded by an electrically insulative second layer, in turn covered by a semiconductive third layer. The outer layers are sheaths which serve to protect the cable. Low-voltage cables (voltage lower than 20 kilovolts (kV)) have a conductive core surrounded by an insulating structure which is coaxial thereabout and covered in a sheath. This composition is also usable as an insulating material.

In the event of a short circuit occurring in a cable, temperatures locally rising to 200° C. can be observed. At these temperatures and under stress, the material is subject to deformation or creep. This elongation when hot is evaluated using the so-called "hot set test" (HST) under conditions which are defined in standard NF EN 60811-2-1. Compositions are being sought which present good results in the "hot set test".

Document WO-88/05449 proposes in its examples 11 and 12 an extrudable composition which comprises a mixture of a copolymer of an ethylenically-unsaturated compound and an unsaturated ester containing an acrylate such as ethylene butylacrylate (EBA) (example 11) or an ethylene methylacrylate (EMA) (example 12) with a hydrolizable silane compound having no ethylenic unsaturation, such as a 3-amino-propyltrimethoxysilane (MEAM) and also with a thermoplastic polymer having no functional groups such as a polyethylene homopolymer, e.g. low density polyethylene (LDPE).

The resulting material presents good adhesion on metals or polar substances and it is used for this purpose in cables. However that material is not cross-linkable.

Document EP-A-0 802 224 describes an extrudable composition that is cross-linkable, and that is constituted by a mixture comprising a thermoplastic polymer material, a hydrolizable silane compound, a non-cross-linked elastomer, and a cross-linking agent. The thermoplastic polymer material and the hydrolizable silane compound respectively carry mutually reactive functional groups so that they react together selectively. The elastomer is cross-linked dynamically and selectively by the cross-linking agent in the mixture. The thermoplastic polymer material carrying reactive functional groups is a commercially-available substance, preferably polyethylene grafted by maleic anhydride. The silane compound is preferably aminoalkoxysilane. The amine groups of the silane compound react selectively with the maleic anhydride groups of the polyethylene, and the alkoxy groups of the silane compound react with the surface hydroxyl groups of the filler. The elastomer is an ethylene vinyl acetate (EVA) copolymer which is cross-linked dynamically and selectively by the cross-linking agent.

The special feature of that composition is the choice of basic components in the mixture which have specific and different reaction kinetics, thereby enabling the composition to be made in a single stage. As a result, the choice of basic components is very restricted and the cost thereof is high.

OBJECTS AND SUMMARY OF THE INVENTION

An object of the present invention is to propose an extrudable composition that is cross-linkable in air to give a cross-linked material which is recyclable and which is simpler to manufacture, and which is of lower cost than known compositions.

In a first aspect, the present invention thus provides a composition that is extrudable and cross-linkable in air, comprising a mixture:

of a copolymer of an ethylenically-unsaturated compound and an unsaturated ester;

of a hydrolizable silane compound having no ethylenic unsaturation and containing functional groups; and of a thermoplastic polymer;

wherein said functional groups of said ester are selectively reactive with functional groups of said silane compound, and wherein said thermoplastic polymer has no functional groups.

The invention is based on the discovery that under certain conditions it would appear that a selective reaction occurs between the functional groups of the ester of the copolymer and the reactive functional groups carried by the silane.

The composition of the invention comprises a thermoplastic polymer that has no functional groups liable to interfere with the reaction between the silane and the copolymer involved in cross-linking the composition. This thermoplastic copolymer confers good mechanical properties on the composition of the invention since it contributes to reinforcing its structure.

The present invention makes it possible to use a vast range of silane compounds. In addition, it does not require recourse to polymers having special functional groups, and consequently it makes it possible to use a vast range of polymers, and in particular polymers that are the most widespread and the least expensive.

The present invention makes it possible to obtain a composition having good resistance to creep at high temperature.

In addition, a composition of the invention makes it possible to obtain finished products which can be recycled. It also makes it easy to obtain finished products that are very flexible, for example cables based essentially on (poly)vinyl acetate.

In a second aspect, the present invention provides a method of preparing a composition which enables the composition of the invention to be cross-linked, and including in particular a "dynamic cross-linking" step.

This step serves in particular to lengthen the chains of the polymer and of the copolymer and thus reduce the number of chains. In this way, this step makes it possible to improve compatibility between the polymer and the copolymer by promoting cross-linking of the composition.

In another aspect, the present invention provides a cable whose insulation and/or sheath contain the composition obtained by the method.

DETAILED DESCRIPTION OF THE INVENTION

Other characteristics and advantages of the invention are described below in detail in the following description which is given by way of non-limiting illustration.

Composition of the invention

A composition of the invention comprises in particular a copolymer of an ethylenically-unsaturated compound and an unsaturated compound and unsaturated ester.

The selective reaction between the silane and the ester on which the invention is based can be illustrated by the following scheme:

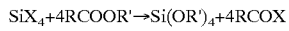

$$SiX_4 + 4RCOOR' \rightarrow Si(OR')_4 + 4RCOX$$

in which:

X represents a functional group carried by the silane $SiX_4$; and

RCOOR' represents a fragment of the copolymer of an ethylenically-unsaturated compound and an unsaturated ester.

In the invention, the unsaturated ester of the copolymer generally satisfies the formula $R_1COOR_2$ in which:

$R_1$ is an alkyl group preferably having 1 to 4 carbon atoms; and $R_2$ is an alkylene group preferably having 2 to 4 carbon atoms.

Advantageously, the functional groups of the ester of the invention can comprise acetates. Acetates promote the above-mentioned reaction, unlike other groups such as acrylates.

A composition of the invention preferably also comprises a cross-linking agent which can be a peroxide, a phenolic resin, a sulfur-containing derivative, or a mixture of these compounds, in particular. The composition of the invention generally contains 0.5 to 7 parts by weight and preferably 0.5 to 3 parts by weight of said cross-linking agent.

In the invention, the ethylenically-unsaturated compound is preferably ethylene.

As examples of copolymers entering into the composition of the invention, mention can be made of ethylene vinyl acetate copolymers (EVA), ethylene vinyl propionate copolymers, ethylene allyl acetate copolymers, and ethylene allyl propionate copolymers.

It is preferable to use an ethylene vinyl acetate copolymer (EVA) containing up to 80% by weight vinyl acetate, and more specifically an EVA containing 10% to 70% by weight vinyl acetate.

Concerning proportions, the composition of the invention generally comprises 25 to 95 parts and preferably 30 to 85 parts by weight of copolymer.

In an embodiment, the hydrolizable silane having no ethylenic unsaturation of the invention can be a trialkoxysilane or a tetralkoxysilane, such as tetraethoxysilane.

It is preferable to use a silane containing an amino function, such as aminotrialkoxysilane. As an example of such a silane, mention can be made of aminopropyltriethoxysilane and of aminopropyltrimethoxysilane.

The composition of the invention generally comprises 0.5 to 5 parts and preferably 0.7 to 4 parts by weight of the silane compound.

The term "silane compound having groups that are selectively reactive with the ester functional groups of the copolymer" as used in the present invention means a compound which, under reaction conditions, is capable of reacting essentially with the ester functional groups of the copolymer in the scheme specified above. Thus, it is understood that the composition can include other reactive compounds, providing they do not interfere significantly with the selective reaction between the reactive groups of the silane and of the copolymer.

The thermoplastic polymer having no functional groups can be a homopolymer of an olefin having 2 to 6 carbon atoms and a polymer of 2 olefins each having 2 to 6 carbon atoms, the olefins being constituted, for example, by ethylene, propylene, butene, pentene, hexene, isobutylene, methyl-butene, methyl-pentene, dimethyl-butene, or ethyl-butene. In general, polyethylene is used, and preferably high density polyethylene (HDPE).

The proportion of polymer having no functional group in the composition generally lies in the range 0.5 to 75 parts by weight.

In a preferred embodiment, the composition of the invention can also include a filler.

This filler is preferably a filler that is not surface-reactive, such as chalk, carbon black, non-reactive magnesia, or natural or synthetic clay.

The proportion of this non-surface-reactive filler in the composition is not crucial. It generally lies in the range 0 to 230 parts by weight and usually in the range 0 to 180 parts by weight.

The composition of the invention does not require the use of fillers having reactive surfaces, and consequently it makes it possible to employ a vast range of fillers, and in particular those which are the most widely available and the least expensive.

In a variant, the composition of the invention can also contain a filler that is surface-reactive, of the type used in application EP-A-0 802 223 in the name of the Applicant. This filler can be reactive magnesia, alumina, kaolin, or mica. Since the filler is surface-reactive, it can interfere with the reaction between the silane and the copolymer.

In general, the content of said surface-reactive filler is less than 250 parts by weight, and preferably less than 160 parts by weight.

The composition is preferably free of any surface-reactive filler.

Advantageously, the composition of the invention can also include a catalyst for the reaction between the silane functional group(s) and the ester functional groups of the copolymer.

Such a catalyst can be based on an amine, a tin salt, or a molecule containing at least one atom of tin.

The proportion of catalyst in the composition of the invention generally lies in the range 0 to 500 parts per million (ppm) and more usually in the range 0 to 100 ppm.

Naturally, the composition of the invention can include various additives of the kind commonly used in fabricating cross-linked copolymers. As examples of such additives, mention can be made antioxidants, flame retarders, anti-UV agents, plasticizers, and coloring agents.

The proportions of these various additives in the composition of the invention generally lie in the range 0 to 5 parts by weight and usually in the range 0.1 to 2 parts by weight.

Once the composition of the invention has been cross-linked, it presents no significant elongation after 15 minutes (min) at 200° C. under a stress of 0.2 mega Pascals (MPa) which are the conditions defined by standard NF EN 60811-2-1, after being stored in ambient air without taking special precautions for a period of one week.

Its hardness on the Shore A scale is preferably less than 95.

It preferably presents breaking elongation greater than 130% and more preferably of not less than 150%.

The ultimate tensile strength of the cross-linked composition of the invention is preferably greater than 7 MPa.

Method of the Invention

A cross-linked composition of the invention can be prepared in a single dynamic cross-linking step in the presence of the copolymer and of the thermoplastic polymer.

Under such circumstances, shear is created by kneading the copolymer and the thermoplastic polymer during a "compounding" step of preparing the mixture, e.g. in an extruder having two contra-rotating screws, or in an internal mixer.

The addition of a peroxide or some other cross-linking agent then enables the compatibility of the various polymers to be improved by lengthening the chains of the polymer and of the copolymer, and thus reducing the number of chains. This reduces the number of cross-linking bridges required for cross-linking the material of the invention.

Dynamic cross-linking is generally initiated at a temperature higher than 150° C. and preferably lying in the range 170° C. to 230° C. and under a large amount of shear, i.e. greater than 20 s$^{-1}$ and preferably lying in the range 50 s$^{-1}$ to 250 s$^{-1}$.

The silane can be incorporated during the compounding, and it is preferably incorporated during the step of extruding the composition. Thereafter, cross-linking which has started under the above-specified temperature and shear is then generally allowed to continue in ambient air. Cross-linking is allowed to continue in ambient air for a period lying in the range a few hours to a few days.

Finished Products

The dynamic cross-linking is preferably performed under conditions that make it possible to obtain a cross-linked composition having hardness on the Shore A scale of less than 95.

The composition of the invention is advantageously extruded in a manner that is appropriate for producing a variety of semifinished products which, once cross-linking has been completed, become finished products benefitting from the mechanical properties and the ability to withstand high temperatures that are possessed by the composition of the invention once cross-linked.

Examples of such finished products include power cables in which the insulation and/or the sheath is constituted by the cross-linked composition of the invention.

The insulation and/or the sheath does not present significant elongation after 15 min at 200° C. under 0.2 MPa of stress, conditions defined by standard NF EN 60811-2-1, after being stored in air without taking special precautions for one week.

Their hardness on the Shore A scale is preferably less than 95; their breaking elongation is preferably greater than 130%, and more preferably not less than 150%. Their ultimate tensile strength is preferably greater than 7 MPa.

EXAMPLES

The following examples are given purely by way of non-limiting illustration.

Example 1

A formulation of the invention was mixed, extruded, and allowed to cross-link in ambient air without special precautions, and then its ultimate tensile strength (UTS in MPa), its breaking elongation (BE in %), and its resistance (or non-resistance) to creep or deformation in application of standard NF EN 60811-2-1 (HST) and its Shore A hardness in application of standard NF 51-109 were all measured. The composition of the formulation and the results of the measurements are summarized in the following table:

| COMPONENTS | |
|---|---|
| Lepraven 500 | 83 |
| HDPE 47100 | 17 |
| Magnifin H10 | 100 |
| Santonox TBMC | 0.5 |
| Trigonox 145-45pd | 1.4 |
| Aminopropyltriethoxysilane | 1.5 |
| PROPERTIES | |
| UTS (MPa) | 10.5 |
| BE (%) | 210 |
| HST (200° C./0.2 MPa/15 min) | yes |
| Shore A hardness | 74 |

It can be seen that the thermomechanical properties and the resistance to creep or deformation are good. Shore A hardness is low, which is advantageous, particularly for use as cable insulation or as a cable sheath. In addition, the resulting composition possesses good resistance to hot pressing (110° C.).

This cross-linked composition can subsequently be reworked (extruded again) after at least three months' storage in ambient air, and it conserves mechanical properties similar to those described above.

Example 2

In a manner analogous to Example 1, a formulation of the invention was mixed, extruded, and allowed to cross-link in ambient air without taking special precautions, and then its ultimate tensile strength (UTS in MPa), its breaking elongation (BE in %), its resistance (or non-resistance) to creep or deformation in accordance with standard NF EN 60811-2-1 (HST), and its Shore A hardness in accordance with standard NF 51-109, were all measured.

The composition of the formulation and the results of the measurements are summarized in the following table:

| COMPONENTS | |
|---|---|
| Elvax 260 | 20 |
| Elvax 40/03 | 60 |
| HDPE 47100 | 20 |
| Hydrofy G1.5 | 150 |
| Santonox TBMC | 0.5 |
| Trigonox 145-45pd | 1 |
| Aminopropyltriethoxysilane | 2 |
| PROPERTIES | |
| UTS (MPa) | 13 |
| BE (%) | 150 |
| HST (200° C./0.2 MPa/15 min) | yes |
| Shore A hardness | 92 |

Example 3

A formulation of the the prior art was mixed, extruded, and allowed to cross-link in ambient air without taking special precautions, and then its ultimate tensile strength (UTS in MPa), its breaking elongation (BE in %), its resistance (or non-resistance) to creep or deformation in accordance with standard NF EN 60811-2-1 (HST), and its Shore A hardness in accordance with standard NF 51-109, were all measured.

The composition of the formulation and the results of the measurements are summarized in the following table:

| COMPONENTS | |
| --- | --- |
| Elvax 260 | 20 |
| Elvax 40/03 | 60 |
| HDPE 47100 | 20 |
| Hydrofy G1.5 | 150 |
| Santonox TBMC | 0.5 |
| Trigonox 145-45pd | 1 |
| Aminopropyltriethoxysilane | 2 |
| PROPERTIES | |
| UTS (MPa) | 12 |
| BE (%) | 160 |
| HST (200° C./0.2 MPa/15 min) | no |
| Shore A hardness | 92 |

Without subsequent processing (passing through an oven or a pool), the cross-linking of this material was still not complete after one week.

Example 4

A low-voltage power cable was made having an outer sheath constituted by the cross-linked composition of the present invention.

The components specified in Example 1 were mixed in a mixer (continuous or discontinuous mixers are suitable) and then the composition was extruded, a technique which serves to transform the granules or strips of the compound into a finished or semifinished product in the form of a coating for a cable. The material was transported by means of a screw from the feed zone to the die. The material plasticized under the action of the mixing imparted by rotation of the screw and heat delivered from the outside. Its pressure rose progressively along the screw, thus forcing the material to pass through the die to give it a permanent shape on leaving the die. By using a die head of appropriate shape, that technique serves to cover copper wires or wires that have already been insulated.

Its ultimate tensile strength (UTS in MPa), its breaking elongation (BE in %), its resistance (or non-resistance) to creep or deformation in accordance with standard NF EN 60811-2-1 (HST), and its Shore A hardness in accordance with standard NF 51-109, were all measured. The results of the measurements are given in the following table:

| PROPERTIES | |
| --- | --- |
| UTS (MPa) | 13 |
| BE (%) | 150 |
| HST (200° C./0.2 MPa/15 min) | yes |
| Shore A hardness | 92 |

The sheath-forming material of the cable was suitable for subsequent reworking, i.e. it could be extruded again to form a new sheath after the cable had been in use for six months or more. The sheath made with the recycled material conserves mechanical properties similar to those of the initial sheath.

The hydrolizable silane compound having no ethylenic unsaturation, such as amino silane, can be introduced into the composition during the "compounding" step of preparing the mixture, or else during the extrusion.

Example 5

A formulation of the invention was mixed, extruded, and allowed to cross-link in ambient air without taking special precautions, and then its ultimate tensile strength (UTS in MPa), its breaking elongation (BE in %), its resistance (or non-resistance) to creep or deformation in accordance with standard NF EN 60811-2-1 (HST), and its Shore A hardness in accordance with standard NF 51-109, were all measured.

The composition of the formulation and the results of the measurements are summarized in the following table:

| COMPONENTS | |
| --- | --- |
| Lepraven 700 | 66 |
| EVA 265 (with 26.5% vinyl acetate) | 33 |
| HDPE 47100 | 0.5 |
| Magnifin H10 | 120 |
| Santonox TBMC | 0.5 |
| Trigonox 145-45pd | 1 |
| Aminopropyltriethoxysilane | 2 |
| PROPERTIES | |
| UTS (MPa) | 11 |
| BE (%) | 190 |
| HST (200° C./0.2 MPa/15 min) | yes |
| Shore A hardness | 78 |

It can be seen that the thermomechanical properties and the resistance to creep or deformation are good. Shore A hardness is low which is advantageous, particularly for use as a cable insulation or sheath. In addition, this composition possesses good ability to withstand oil (24 hours at 100° C.) in application of ASTM standard No. 2.

This cross-linked composition is suitable for being subsequently reworked (extruded again) after being stored for at least three months in ambient air, and it conserves mechanical properties similar to those described above.

What is claimed is:

1. An extrudable composition, comprising a mixture of:
   a copolymer of an ethylenically-unsaturated compound and an unsaturated ester, said ester having first functional groups;
   a hydrolizable silane compound having no ethylenic unsaturation and containing second functional groups; and
   a thermoplastic polymer having no functional groups;
   wherein said unsaturated ester satisfies the formula $R_1COOR_2$ in which $R_1$ is an alkyl group and $R_2$ is an alkylene group; and
   wherein said first functional groups are selectively reactive with said second functional groups so that said composition is cross-linkable in air.

2. A composition according to claim 1, wherein said first functional groups comprise acetate.

3. A composition according to claim 1, further comprising a cross-linking agent.

4. A composition according to claim 3, wherein the cross-linking agent is selected from the group consisting of peroxides, phenolic resins, sulfur-containing derivatives, and mixtures thereof.

5. A composition according to claim 1, wherein said copolymer is an ethylene vinyl acetate copolymer.

6. A composition according to claim 1, wherein said hydrolizable silane compound having no ethylenic unsaturation is an alkoxysilane.

7. A composition according to claim 1, wherein said silane compound is an alkoxysilane having at least one amino function.

8. A composition according to claim 1, wherein said thermoplastic polymer is a polyethylene.

9. A composition according to claim 1, further comprising a filler that is not surface-reactive.

10. A composition according to claim 1, further comprising a catalyst for the reaction between said functional groups of said ester and said functional groups of the silane.

11. A composition according to claim 1, comprising:
25 to 95 parts by weight of said copolymer;
0.5 to 5 parts by weight of said silane compound;
0.5 to 7 parts by weight of a cross-linking agent;
0 to 230 parts by weight of a filler that is not surface-reactive; and
0.5 to 75 parts by weight of said thermoplastic polymer having no functional groups.

12. A composition according to claim 1, comprising:
30 to 85 parts by weight of said copolymer;
0.7 to 4 parts by weight of said silane compound;
0.5 to 3 parts by weight of a cross-linking agent;
0 to 180 parts by weight of a filler that is not surface-reactive; and
0.5 to 75 parts by weight of said thermoplastic polymer having no functional groups.

13. A composition according to claim 1, wherein, once cross-linked, the composition presents no significant elongation after 15 minutes at 200° C. under stress of 0.2 MPa, after being stored in ambient air for one week.

14. A composition according to claim 13, possessing hardness on the Shore A scale of less than 95.

15. A composition according to claim 13, presenting breaking elongation of more than 130%.

16. A composition according to claim 13, possessing ultimate breaking strength greater than 7 MPa.

17. A method of cross-linking an extrudable composition, including a dynamic cross-linking step,
wherein said composition comprises a mixture of:
a copolymer of an ethylenically-unsaturated compound and an unsaturated ester, said ester having first functional groups;
a hydrolizable silane compound having no ethylenic unsaturation and containing second functional groups; and
a thermoplastic polymer having no functional groups;
wherein said unsaturated ester satisfies the formula $R_1COOR_2$ in which $R_1$ is an alkyl group and $R_2$ is an alkylene group; and
wherein said first functional groups are selectively reactive with said second functional groups so that said composition is cross-linkable in air.

18. A method according to claim 17, wherein the dynamic cross-linking is performed by kneading said copolymer and said thermoplastic polymer in the presence of a cross-linking agent.

19. A method according to claim 17, wherein the dynamic cross-linking is initiated at a temperature greater than 150° C. under shear greater than 20 $s^{-1}$.

20. A power cable having insulation and/or a sheath containing a composition obtained by a method including a dynamic cross-linking step,
wherein said composition comprises a mixture of:
a copolymer of an ethylenically-unsaturated compound and an unsaturated ester, said ester having first functional groups;
a hydrolizable silane compound having no ethylenic unsaturation and containing second functional groups; and
a thermoplastic polymer having no functional groups;
wherein said unsaturated ester satisfies the formula $R_1COOR_2$ in which $R_1$ is an alkyl group and $R_2$ is an alkylene group; and
wherein said first functional groups are selectively reactive with said second functional groups so that said composition is cross-linkable in air.

21. A composition according to claim 7, wherein said alkoxysilane having at least one amino function is an aminopropyltriethoxysilane.

22. A method according to claim 18, wherein said cross-linking agent is a peroxide.

* * * * *